US012792554B2

(12) United States Patent
Wang et al.

(10) Patent No.: US 12,792,554 B2
(45) Date of Patent: Nov. 10, 2026

(54) USB CABLE, E-MARKER DEVICE, AND HUMIDITY DETECTION METHOD FOR USB CONNECTOR

(71) Applicant: VIA LABS, INC., New Taipei City (TW)

(72) Inventors: Tze-Shiang Wang, New Taipei City (TW); Hui-Neng Chang, New Taipei City (TW); Sheng-Hsien Yen, New Taipei City (TW); Nai-Chuan Hung, New Taipei City (TW)

(73) Assignee: VIA LABS, INC., New Taipei City (TW)

( * ) Notice: Subject to any disclaimer, the term of this patent is extended or adjusted under 35 U.S.C. 154(b) by 48 days.

(21) Appl. No.: 18/791,435

(22) Filed: Aug. 1, 2024

(65) Prior Publication Data

US 2025/0139049 A1 May 1, 2025

(30) Foreign Application Priority Data

Oct. 30, 2023 (TW) ................................ 112141479

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ................................................... G06F 18/2178
See application file for complete search history.

(56) References Cited

U.S. PATENT DOCUMENTS

| | | | | |
|---|---|---|---|---|
| 11,379,026 | B2 | 7/2022 | Lee et al. | |
| 2016/0313270 | A1* | 10/2016 | Connell | G01R 31/69 |
| 2022/0404891 | A1* | 12/2022 | Wang | G06F 1/26 |
| 2023/0025195 | A1* | 1/2023 | Luo | H01R 13/6683 |
| 2023/0259188 | A1 | 8/2023 | Lee et al. | |

* cited by examiner

*Primary Examiner* — Henry Tsai
*Assistant Examiner* — Juanito C Borromeo
(74) *Attorney, Agent, or Firm* — JCIPRNET

(57) ABSTRACT

A USB cable, an e-marker device, and a humidity detection method for a USB connector are provided. The USB cable includes a first USB connector, a second USB connector, and an e-marker device. The second USB connector is coupled to the first USB connector. The e-marker device is coupled to a CC pin and a target pin of the first USB connector. The e-marker device detects a parasitic electrochemical impedance between the target pin and ground during a test period. The e-marker device obtains humidity information of the first USB connector based on the parasitic electrochemical impedance.

38 Claims, 12 Drawing Sheets

USB CABLE, E-MARKER DEVICE, AND HUMIDITY DETECTION METHOD FOR USB CONNECTOR

CROSS-REFERENCE TO RELATED APPLICATION

This application claims the priority benefit of Taiwan application serial no. 112141479, filed on Oct. 30, 2023. The entirety of the above-mentioned patent application is hereby incorporated by reference herein and made a part of this specification.

BACKGROUND

Technical Field

The invention relates to anomaly detection of a universal serial bus (USB) connector, and particularly relates to a USB cable, an e-marker device and a humidity detection method for a USB connector.

Description of Related Art

Type-C USB connector (which is referred to as USB-C connector hereinafter) is an emerging and widely used interface. The USB-C connector not only supports typical USB data interconnection, but also supports diverse power delivery options. Based on a USB power delivery (PD) specification, an electronic device may provide power to another electronic device through a USB-C connector, such as a mobile power supply supplies power to a mobile phone, or a computer host supplies power to a monitor. In order to cope with diverse power delivery options, an e-marker may be installed in a cable of the Type-C USB specification. When the USB-C connector of the USB cable is connected to a USB-C connector that supports the USB PD specification and may be used as a power supply source, the power supply source may send a request message through a configuration channel (CC) pin of the USB-C connector, and the e-marker in the USB cable may reply a data message through the CC pin after receiving the request message. Therefore, the power supply source may learn relevant information of the USB cable, such as a withstand voltage, a withstand current, a withstand power and/or other information of the USB cable.

In some application scenarios, a power of the USB-C connector may be quite large (for example, from 5 watts to 100 watts), so that power supply security of the USB-C connector is one of many focuses of attention. For the power supply security, when the USB-C connector of the power supply source and the USB-C connector of the power receiving sink are connected to each other through the USB cable, based on the USB PD specification, the power supply source and the power receiving sink may exchange warning messages such as overvoltage and overcurrent messages through a CC line in the cable. When the USB-C connector is in a high-humidity environment, or even water intrudes into the USB-C connector (for example, the USB-C connector falls into water), the humidity (or moisture, liquid) may affect the power supply security. However, the existing USB technology cannot detect humidity (moisture) in the USB-C connector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a universal serial bus (USB) cable, an e-marker device and a humidity detection method for a USB connector to obtain humidity (or moisture, liquid) information of the USB connector.

In an embodiment of the invention, the USB cable includes a first USB connector, a second USB connector, and an e-marker device. The second USB connector is coupled to the first USB connector, where a first configuration channel (CC) pin of the first USB connector is coupled to a second CC pin of the second USB connector. The e-marker device is coupled to the first CC pin and a target pin of the first USB connector. The e-marker device detects a parasitic electrochemical impedance between the target pin and ground during a test period. The e-marker device obtains humidity information of the first USB connector based on the parasitic electrochemical impedance.

In an embodiment of the invention, the above-mentioned e-marker device includes an anomaly detection circuit. A communication terminal of the anomaly detection circuit is coupled to a first CC pin of a first USB connector. A detection terminal of the anomaly detection circuit is coupled to a target pin of the first USB connector. The anomaly detection circuit detects a parasitic electrochemical impedance between the target pin and ground during a test period. The anomaly detection circuit obtains humidity information of the first USB connector based on the parasitic electrochemical impedance.

The invention provides a humidity detection method for a USB connector including: detecting a parasitic electrochemical impedance between a target pin of the USB connector and ground during a test period; and obtaining humidity information of the USB connector based on the parasitic electrochemical impedance.

Based on the above description, the e-marker device according to the embodiments of the invention may detect the parasitic electrochemical impedance between any target pin of the USB connector and ground. In some embodiments, the target pin may include a sideband use (SBU) pin of the USB connector or other pins. Ideally, when the USB connector is in an environment with 0% humidity, the parasitic electrochemical impedance between the target pin and ground is infinite. As the environmental humidity increases, the parasitic electrochemical impedance between the target pin and ground becomes smaller. Therefore, the e-marker device may obtain the humidity information (environmental humidity) of the USB connector based on the parasitic electrochemical impedance. When the humidity information indicates that the environmental humidity of the USB connector may affect the power supply security, the power delivery between the USB connector and a USB host (power supply source) may be promptly cut off.

To make the aforementioned more comprehensible, several embodiments accompanied with drawings are described in detail as follows.

DESCRIPTION OF THE EMBODIMENTS

Figure 1:
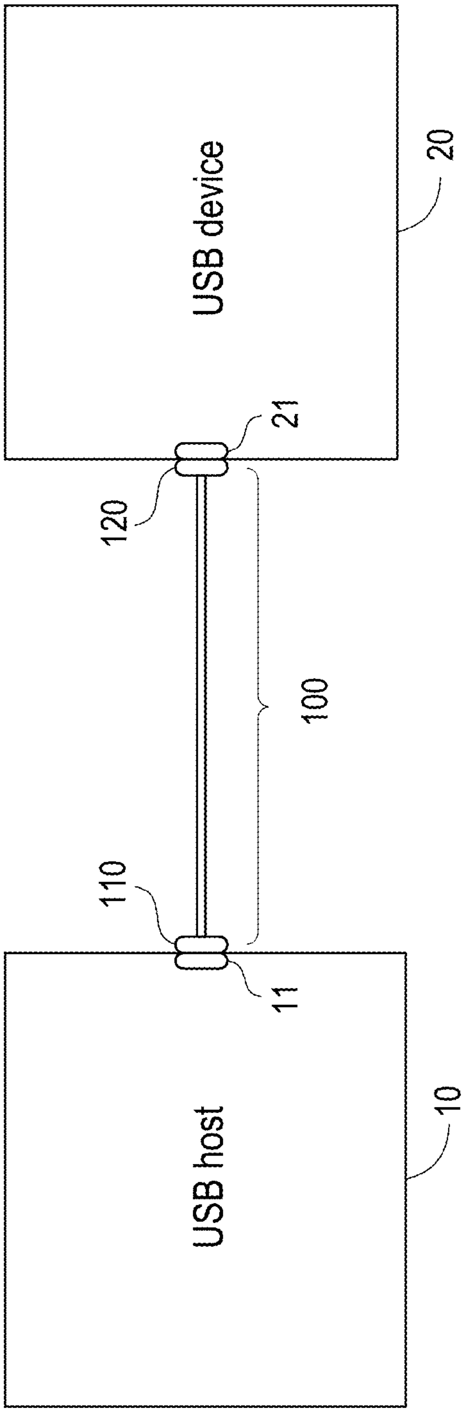
FIG. 1 is a schematic circuit block diagram of a universal serial bus (USB) system according to an embodiment of the invention.

A term "couple (or connect)" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Furthermore, "first", "second", etc. mentioned in the specification and the claims are merely used to name discrete components and should not be regarded as limiting the upper or lower bound of the number of the components, nor is it used to define a manufacturing order or setting order of the components. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic circuit block diagram of a universal serial bus (USB) system according to an embodiment of the invention. The USB system of FIG. 1 includes a USB host 10, a USB cable 100 and a USB device 20. A USB connector 110 of the USB cable 100 may be plugged into a USB connector 11 of the USB host 10, and another USB connector 120 of the USB cable 100 may be plugged into a USB connector 21 of the USB device 20. Therefore, the USB host 10 and the USB device 20 may communicate with each other through the USB cable 100. Based on an actual design, in some embodiments, the USB connector 110 or 120 may be a Type-C USB connector (also known as a USB-C connector) or other types of USB connectors.

Figure 2:
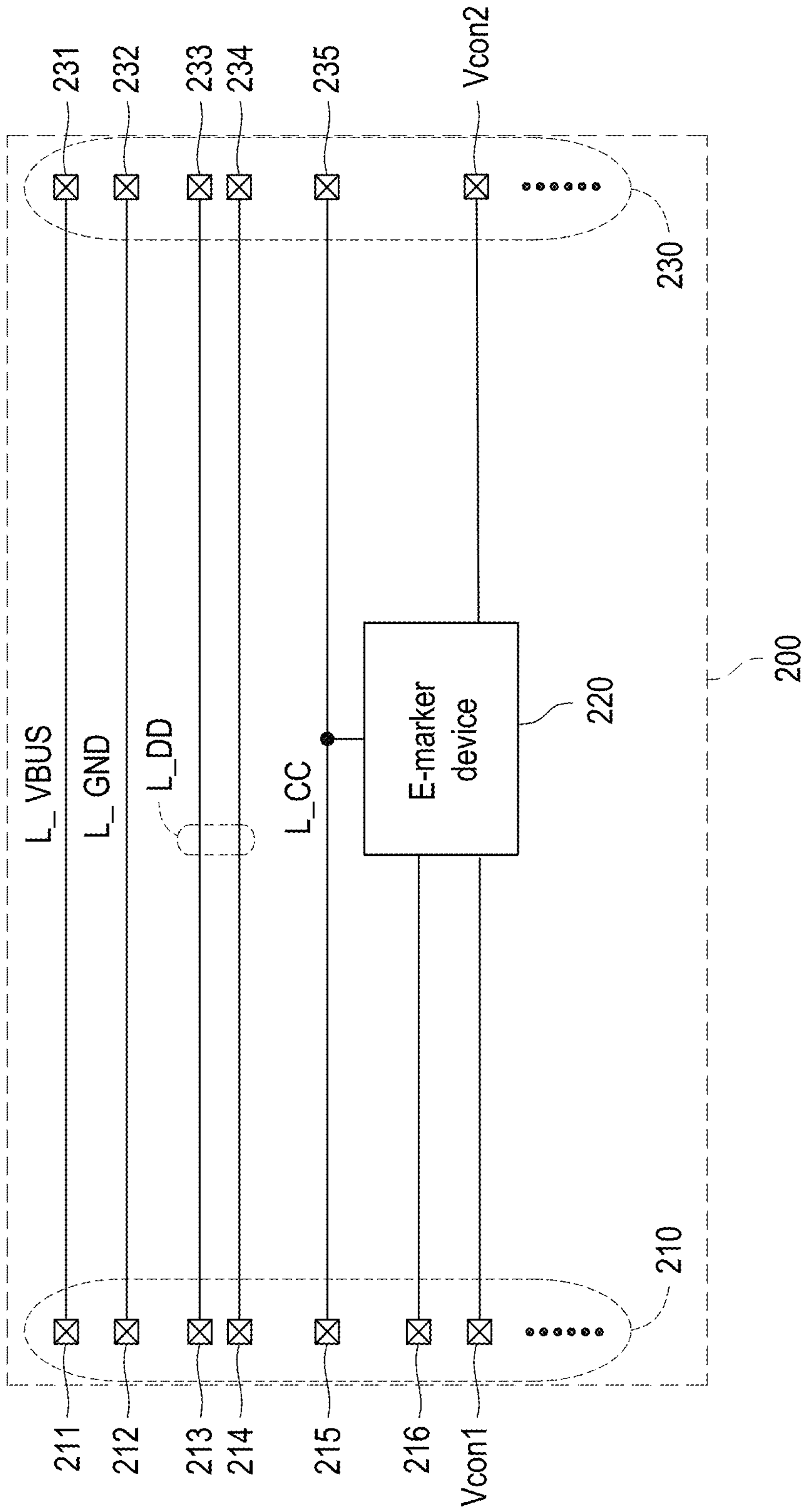
FIG. 2 is a schematic circuit block diagram of a USB cable according to an embodiment of the invention.

FIG. 2 is a schematic circuit block diagram of a USB cable 200 according to an embodiment of the invention. The USB cable 200 shown in FIG. 2 includes a USB connector 210, an e-marker device 220 and a USB connector 230. For descriptions of the USB cable 200, the USB connector 210, and the USB connector 230 shown in FIG. 2, reference may be made to the related descriptions of the USB cable 100, the USB connector 110, and the USB connector 120 shown in FIG. 1. In the USB cable 200, the USB connector 230 is coupled to the USB connector 210.

For example, a power pin 211 of the USB connector 210 (for example, an A4, A9, B4 or B9 pin of the USB connector 210) is coupled to a power pin 231 of the USB connector 230 (for example, an A4, A9, B4 or B9 pin of the USB connector 230) through a power line L_VBUS. The pin names "A1" to "A12" and "B1" to "B12" of the USB connector specified by the USB specification are well known, so that they are not repeated and are not marked in FIG. 2. A reference pin 212 of the USB connector 210 (for example, an A1, A12, B1, or B12 pin of the USB connector 210) is coupled to a reference pin 232 of the USB connector 230 (for example, an A1, A12, B1, or B12 pin of the USB connector 230) through a reference line L_GND. A differential pin pair 213 and 214 of the USB connector 210 are coupled to a differential pin pair 233 and 234 of the USB connector 230 through a differential line pair L_DD. For example, A2 and A3 pins of the USB connector 210 are coupled to B10 and B11 pins of the USB connector 230, or A10 and A11 pins of the USB connector 210 are coupled to B2 and B3 pins of the USB connector 230, or B2 and B3 pins of the USB connector 210 are coupled to A10 and A11 pins of the USB connector 230, or B10 and B11 pins of the USB connector 210 are coupled to A2 and A3 pins of the USB connector 230. A configuration channel (CC) pin 215 of the USB connector 210 (for example, an A5 pin of the USB connector 210) is coupled to a CC pin 235 of the USB connector 230 (for example, an A5 pin of the USB connector 230) through a configuration channel line L_CC.

The e-marker device 220 is coupled to a pin Vcon1 of the USB connector 210 and to a pin Vcon2 of the USB connector 230. Based on the actual design, the pin Vcon1 may be another CC pin of the USB connector 210 (such as a B5 pin of the USB connector 210), and the pin Vcon2 may be another CC pin of the USB connector 230 (such as a B5 pin of the USB connector 230). When the USB connector 210 is connected to a power supply source (such as the USB host 10 or the USB device 20 shown in FIG. 1), the pin Vcon1 (CC pin) may provide power to the e-marker device 220. When the USB connector 230 is connected to the power supply source, the pin Vcon2 (CC pin) may provide power to the e-marker device 220.

The e-marker device 220 is further coupled to the CC pin 215 of the USB connector 210 and the CC pin 235 of the USB connector 230. When the USB connector 210 (or 230) of the USB cable 200 is connected to a USB connector that supports a USB power delivery (PD) specification and may be used as a power supply source (such as the USB connector 11 or 21 shown in FIG. 1), the power supply source may send a request message through the CC pin 215 (or 235) of the USB connector 210 (or 230), and the e-marker device 220 in the USB cable 200 may respond a data message through the CC pin 215 (or 235) after receiving the request message. Therefore, the power supply source may learn relevant information of the USB cable 200, such as a withstand voltage, a withstand current, a withstand power and/or other information of the USB cable 200.

The e-marker device 220 is further coupled to a target pin 216 of the USB connector 210. Although the "target pin" of the USB connector 230 is not shown in FIG. 2, those skilled in the art may deduce the relevant descriptions of the USB connector 210 and the target pin 216 to the USB connector 230 according to an actual design. According to the actual design, in some embodiments, the target pin 216 may include a sideband use (SBU) pin or other pins of the USB connector 210. In order to specifically describe the implementation content, the SBU pin (such as an A8 or B8 pin of the USB connector 210) is used as an example of the target pin 216 in the following description.

Figure 3:
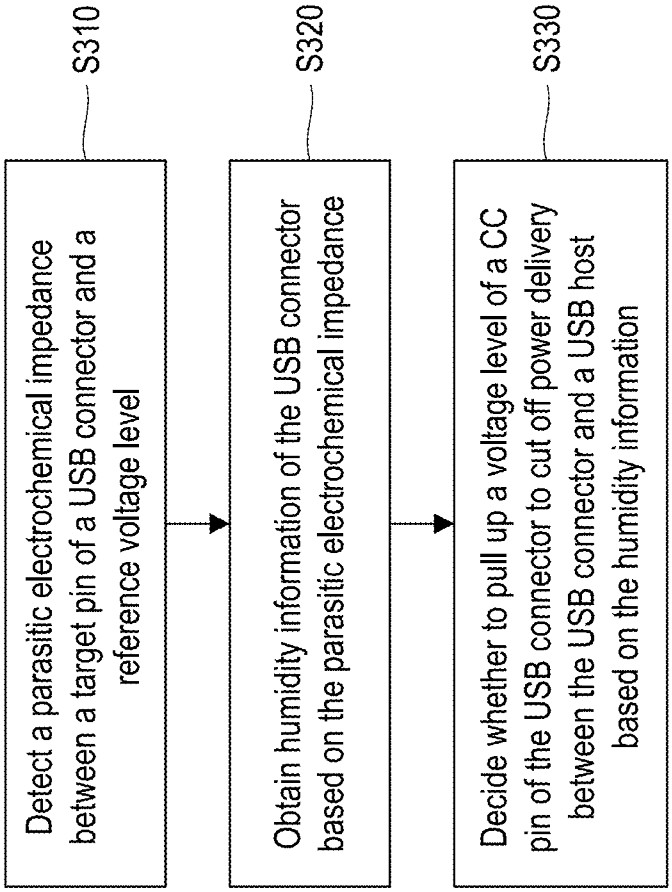
FIG. 3 is a schematic flowchart of a humidity detection method for a USB connector according to an embodiment of the invention.

FIG. 3 is a schematic flowchart of a humidity detection method for a USB connector according to an embodiment of the invention. Referring to FIG. 2 and FIG. 3. In step S310, the e-marker device 220 detects a parasitic electrochemical impedance between the target pin 216 and a reference voltage level, such as ground, during a test period. For example, in some embodiments, the test period is within an initialization period of the USB connector 210 when it is plugged into the USB connector of the USB host (for example, the USB connector 11 of the USB host 10 shown in FIG. 1). In other embodiments, the test period is within any idle period of the target pin 216 (for example, the SBU pin).

Characteristic analysis of an electrochemical impedance spectroscopy circuit model on humidity or liquid provides an important method in electrochemical test technology for damage of the USB connector 210 caused by humidity or liquid. The electrochemical impedance spectroscopy circuit model is an important strategy for studying kinetics of chemical ion formation and pitting surface phenomena of the pins of the USB connector. This method may detect ionization of an electric double layer structure, and activation of a passivation film conversion, induction of pitting corrosion, and an adsorption and desorption process of an active material on a pin surface caused by moisture on the pin surface of the USB connector. The characteristics of electrochemical impedance have been disclosed in various existing literatures, and details thereof are not repeated.

Ideally, i.e., the USB connector 210 is in an environment with a humidity of 0%, and the parasitic electrochemical impedance between the target pin 216 and ground is infinite. As the environmental humidity of the USB connector 210 increases, the parasitic electrochemical impedance between the target pin 216 and ground decreases. Therefore, in step S320, the e-marker device 220 may obtain humidity information (environmental humidity) of the USB connector 210 based on the parasitic electrochemical impedance of the target pin 216 (for example, the SBU pin). When the humidity information indicates that the environmental humidity of the USB connector 210 may affect power supply security, the power delivery between the USB connector 210 and the USB host (power supply source) may be promptly cut off. For example, in step S330, the e-marker device 220 may decide whether to pull up a voltage level of the CC pin 215 of the USB connector 210 to cut off the power delivery between the USB connector 210 and the USB host (for example, the USB host 10 as shown in FIG. 1) based on the humidity information.

Figure 4:
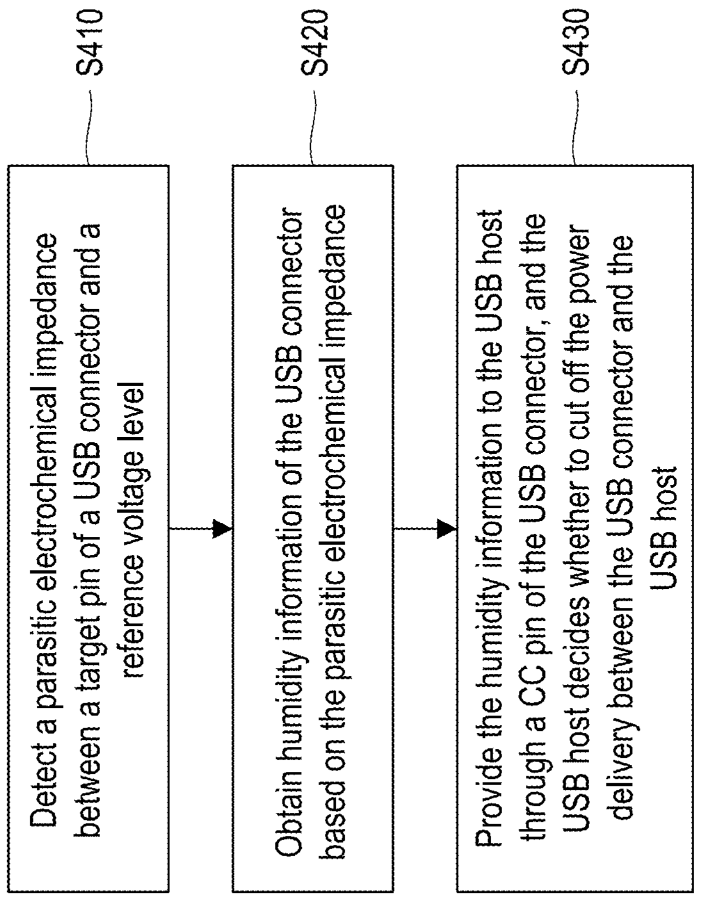
FIG. 4 is a schematic flowchart of a humidity detection method for a USB connector according to another embodiment of the invention.

FIG. 4 is a schematic flowchart of a humidity detection method for a USB connector according to another embodiment of the invention. For steps S410 and S420 shown in FIG. 4, reference may be made to the relevant descriptions of steps S310 and S320 shown in FIG. 3, so that details thereof are not repeated. In step S430 shown in FIG. 4, the e-marker device 220 may provide the humidity information to the USB host (such as the USB host 10 shown in FIG. 1) through the CC pin 215 of the USB connector 210, and the USB host decides whether to cut off the power delivery between the USB connector 210 and the USB host.

In overall, the e-marker device 220 may detect the parasitic electrochemical impedance between any target pin of the USB connector 210 and the ground. In some embodiments, the target pin 216 may include the SBU pin or other pins of the USB connector 210. Ideally, i.e., when the USB connector 210 is in an environment with a humidity of 0%, the parasitic electrochemical impedance between the target pin 216 and ground is infinite. As the environmental humidity increases, the parasitic electrochemical impedance between the target pin 216 and ground decreases. Therefore, the e-marker device 220 may obtain the humidity information (environmental humidity) of the USB connector 210 based on the parasitic electrochemical impedance. When the humidity information indicates that the environmental humidity of the USB connector 210 may affect power supply security, the power delivery between the USB connector 210 and the USB host (power supply source) may be promptly cut off.

Figure 5:
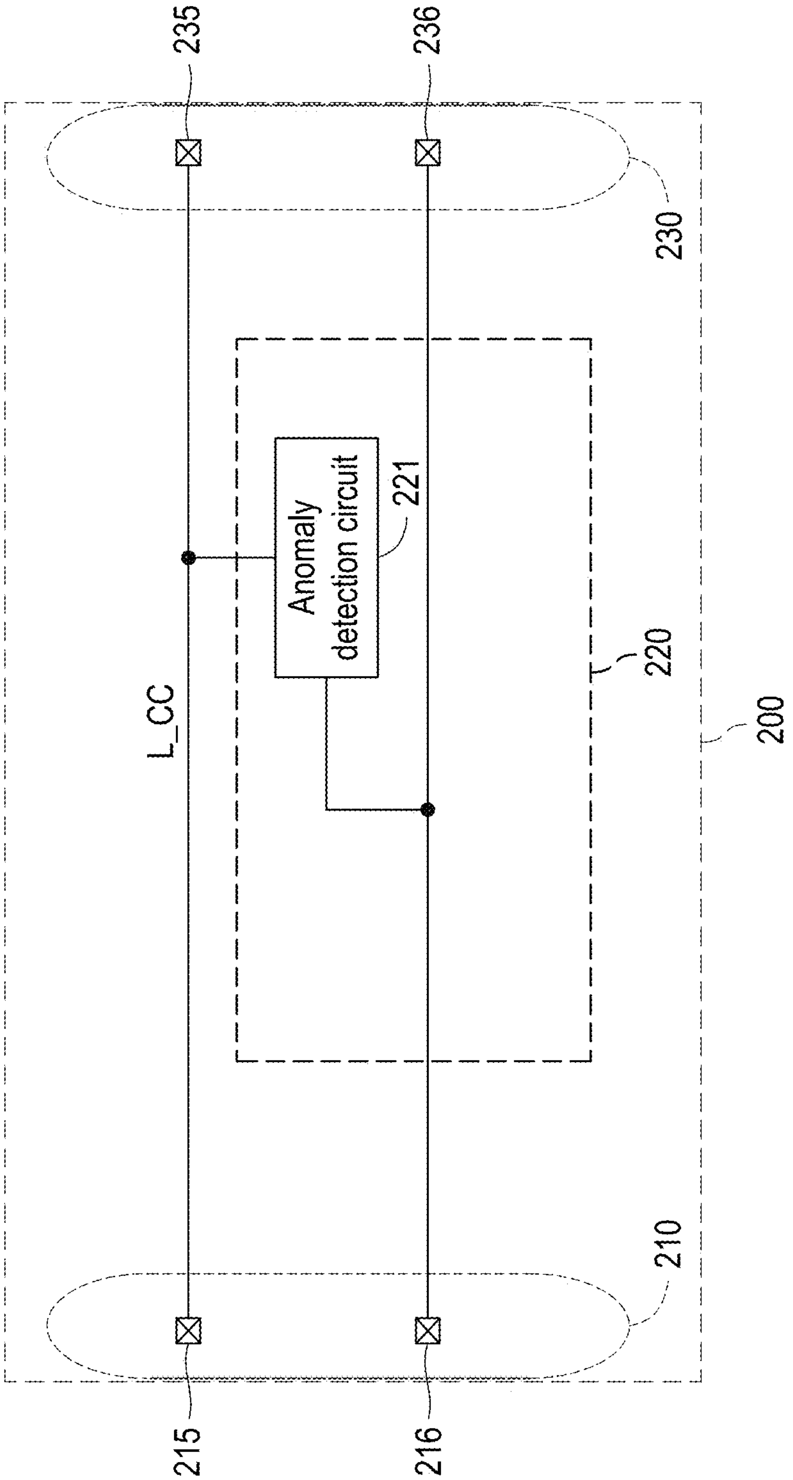
FIG. 5 is a schematic circuit block diagram of an e-marker device according to an embodiment of the invention.

FIG. 5 is a schematic circuit block diagram of an e-marker device 220 according to an embodiment of the invention. The e-marker device 220 shown in FIG. 5 may be used as one of many implementation examples of the e-marker device 220 shown in FIG. 2. For descriptions of the USB cable 200, the USB connector 210, the e-marker device 220 and the USB connector 230 shown in FIG. 5, reference may be made to the related descriptions of the USB cable 200, the USB connector 210, the e-marker device 220 and the USB connector 230 shown in FIG. 2, and details thereof are not repeated. In the embodiment shown in FIG. 5, the e-marker device 220 includes an anomaly detection circuit 221. A communication terminal of the anomaly detection circuit 221 is coupled to the CC pin 215 of the USB connector 210 and the CC pin 235 of the USB connector 230. When the USB connector 210 (or 230) of the USB cable 200 is connected to the USB connector of the power supply source (such as the USB connector 11 or 21 shown in FIG. 1), the power supply source may send a request message through the CC pin 215 (or 235) of the USB connector 210 (or 230), and the anomaly detection circuit 221 may respond a data message through the CC pin 215 (or 235).

A detection terminal of the anomaly detection circuit 221 is coupled to the target pin 216 of the USB connector 210 and the target pin 236 of the USB connector 230. In some embodiments, the target pin 216 may include the SBU pin or other pins of the USB connector 210, and the target pin 236 may include the SBU pin or other pins of the USB connector 230. The anomaly detection circuit 221 may perform the humidity detection method for the USB connector shown in FIG. 3 or FIG. 4. The anomaly detection circuit 221 detects the parasitic electrochemical impedance of the target pin 216 (or 236) during the test period. The anomaly detection circuit 221 obtains the humidity information of the USB connector 210 (or 230) based on the parasitic electrochemical impedance.

When the humidity information indicates that the environmental humidity of the USB connector 210 may affect the power supply security, the power delivery between the USB connector 210 and the USB host (power supply source) may be promptly cut off. For example, in some embodiments, the anomaly detection circuit 221 may decide whether to pull up the voltage level of the CC pin 215 of the USB connector 210 to cut off the power delivery between the USB connector 210 and the USB host based on the humidity information. In some other embodiments, the anomaly detection circuit 221 may provide the humidity information to the USB host through the CC pin 215 of the USB connector 210, and the USB host decides whether to cut off the power delivery between the USB connector 210 and the USB host.

Figure 6:
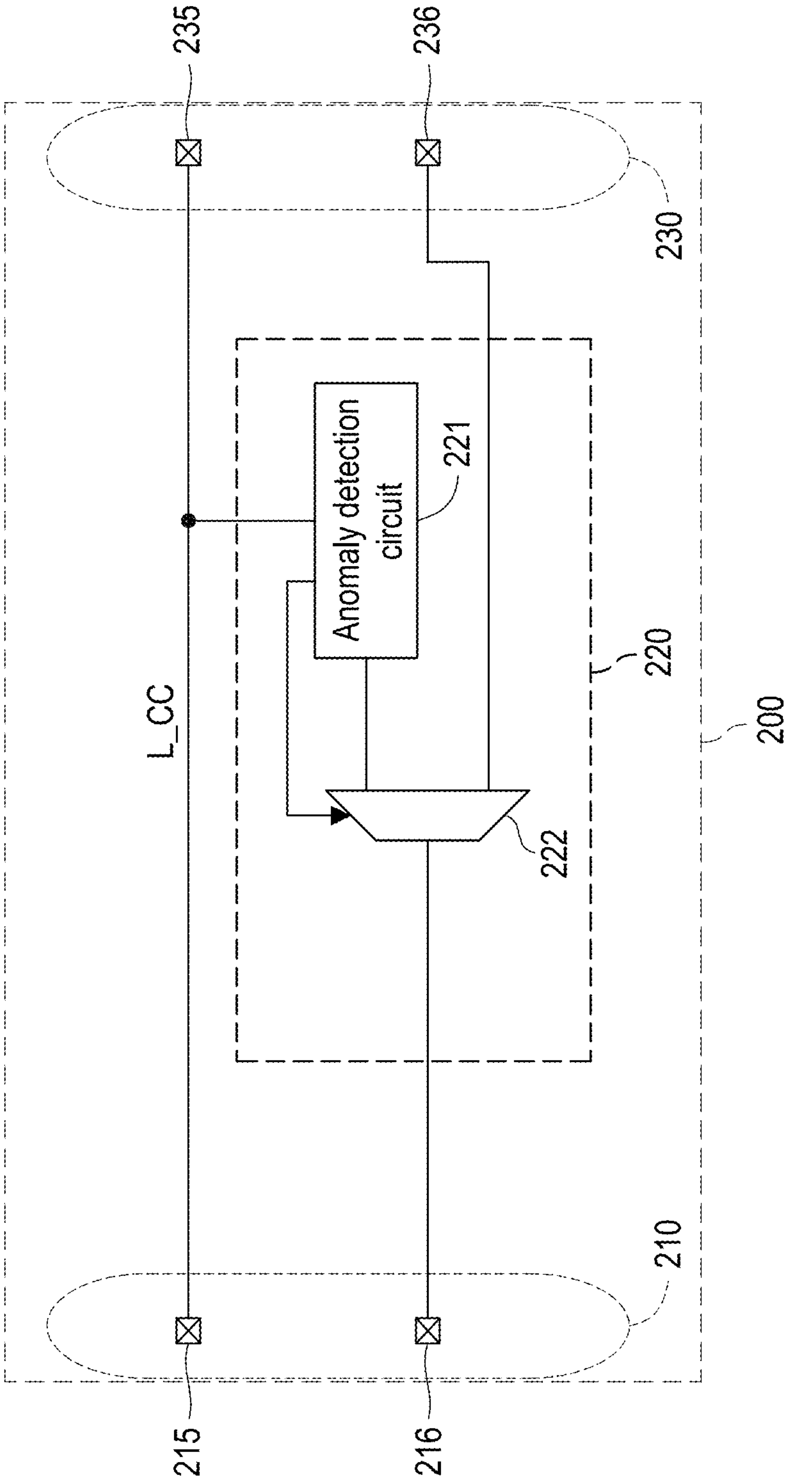
FIG. 6 is a schematic circuit block diagram of an e-marker device according to another embodiment of the invention.

FIG. 6 is a schematic circuit block diagram of an e-marker device 220 according to another embodiment of the invention. The e-marker device 220 shown in FIG. 6 may be used as one of many implementation examples of the e-marker device 220 shown in FIG. 2. For descriptions of the USB cable 200, the USB connector 210, the e-marker device 220 and the USB connector 230 shown in FIG. 6, reference may be made to the related descriptions of the USB cable 200, the USB connector 210, the e-marker device 220 and the USB connector 230 shown in FIG. 2, and details thereof are not repeated.

In the embodiment shown in FIG. 6, the e-marker device 220 includes an anomaly detection circuit 221 and a multiplexer 222. For description of the anomaly detection circuit 221 shown in FIG. 6, reference may be made to the relevant description of the anomaly detection circuit 221 shown in FIG. 5, and details thereof are not repeated. In the embodiment shown in FIG. 6, the multiplexer 222 is coupled between the SBU pin (target pin 216) of the USB connector 210 and the detection terminal of the anomaly detection circuit 221. A common terminal of the multiplexer 222 is coupled to the SBU pin of the USB connector 210. A first selection terminal of the multiplexer 222 is coupled to the detection terminal of the anomaly detection circuit 221. A second selection terminal of the multiplexer 222 is coupled to the SBU pin (target pin 236) of the USB connector 230.

Based on the control of the anomaly detection circuit 221, the multiplexer 222 couples the SBU pin (target pin 216) of the USB connector 210 to the detection terminal of the anomaly detection circuit 221 during the test period. The anomaly detection circuit 221 may detect the parasitic electrochemical impedance between the target pin 216 and ground during the test period. The anomaly detection circuit 221 may obtain the humidity information (environmental humidity) of the USB connector 210 based on the parasitic electrochemical impedance of the target pin 216. When the humidity information indicates that the environmental humidity of the USB connector 210 may affect power supply security, the power delivery between the USB connector 210 and the USB host (power supply source) may be promptly cut off. After the test period ends, the multiplexer 222 couples the SBU pin (target pin 216) of USB connector 210 to the SBU pin (target pin 236) of the USB connector 230.

Figure 7:
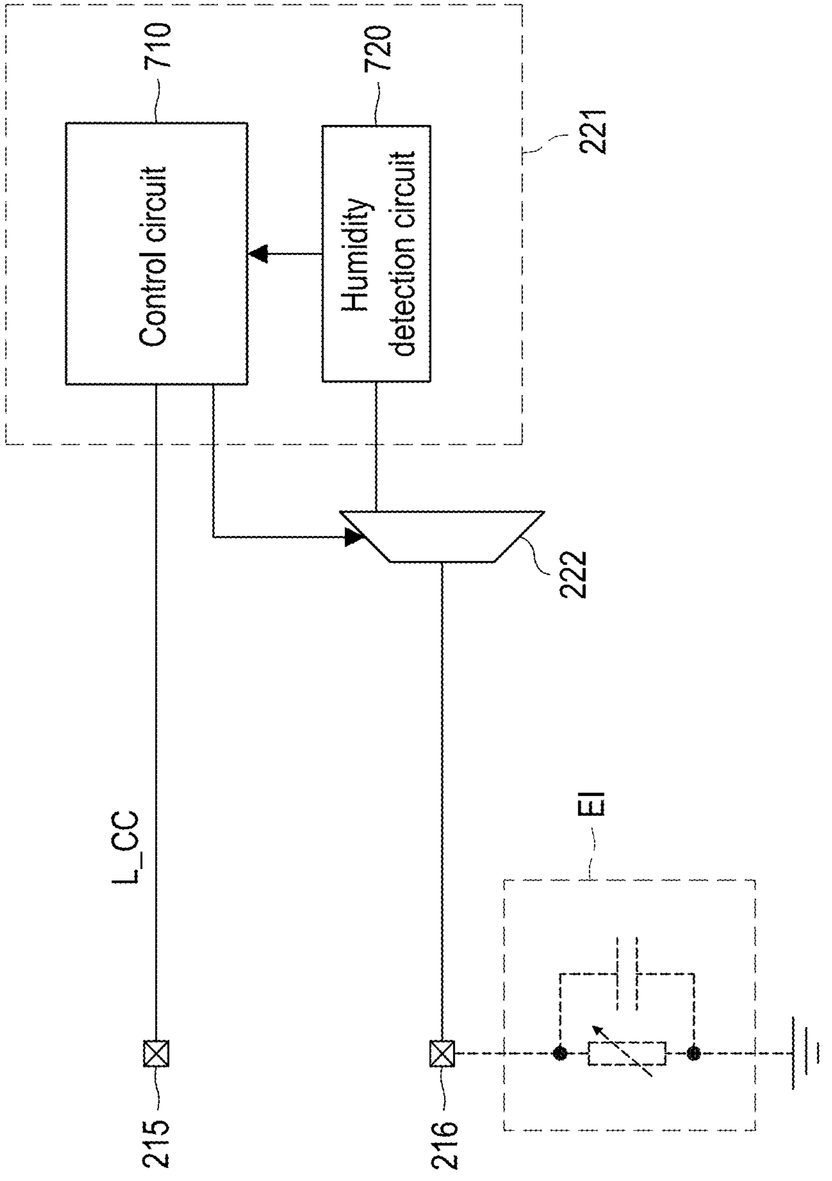
FIG. 7 is a schematic circuit block diagram of an anomaly detection circuit according to an embodiment of the invention.

FIG. 7 is a schematic circuit block diagram of the anomaly detection circuit 221 according to an embodiment of the invention. For descriptions of the anomaly detection circuit 221, the multiplexer 222, the CC pin 215 and the target pin 216 shown in FIG. 7, reference may be made to relevant descriptions of the anomaly detection circuit 221, the multiplexer 222, the CC pin 215 and the target pin 216 shown in FIG. 6, and details thereof are not repeated. FIG. 7 illustrates a parasitic electrochemical impedance EI between the target pin 216 and ground. When a USB plug (USB connector 210) is inserted into a USB socket of the USB host (power supply source), the parasitic electrochemical impedance EI is formed between the target pin 216 (for example, the SBU pin) and ground. The circuit model and characteristics of the parasitic electrochemical impedance EI have been disclosed in various existing literatures, and details thereof are not repeated.

In the embodiment shown in FIG. 7, the anomaly detection circuit 221 includes a control circuit 710 and a humidity detection circuit 720. A detection terminal of the humidity detection circuit 720 is coupled to the detection terminal of the anomaly detection circuit 221. During the test period, the detection terminal of the humidity detection circuit 720 is coupled to the target pin 216 (SBU pin) of the USB connector 210 through the multiplexer 222 to detect the parasitic electrochemical impedance EI between the target pin 216 and ground and obtain a detection result. The control circuit 710 is coupled to the humidity detection circuit 720 to receive the detection result related to the parasitic electrochemical impedance EI. The control circuit 710 obtains the humidity information of the USB connector 210 based on the detection result.

The control circuit 710 is coupled to the CC pin 215 of the USB connector 210. When the humidity information indicates that the environmental humidity of the USB connector 210 may affect power supply security, the control circuit 710 may promptly cut off the power delivery between the USB connector 210 and the USB host (power supply source). For example, in some embodiments, the control circuit 710 may determine whether to pull up the voltage level of the CC pin 215 of the USB connector 210 to cut off the power delivery between the USB connector 210 and the USB host based on the humidity information. In other embodiments, the control circuit 710 may provide the humidity information to the USB host through the CC pin 215 of the USB connector 210, and the USB host decides whether to cut off the power delivery between the USB connector 210 and the USB host.

Figure 8:
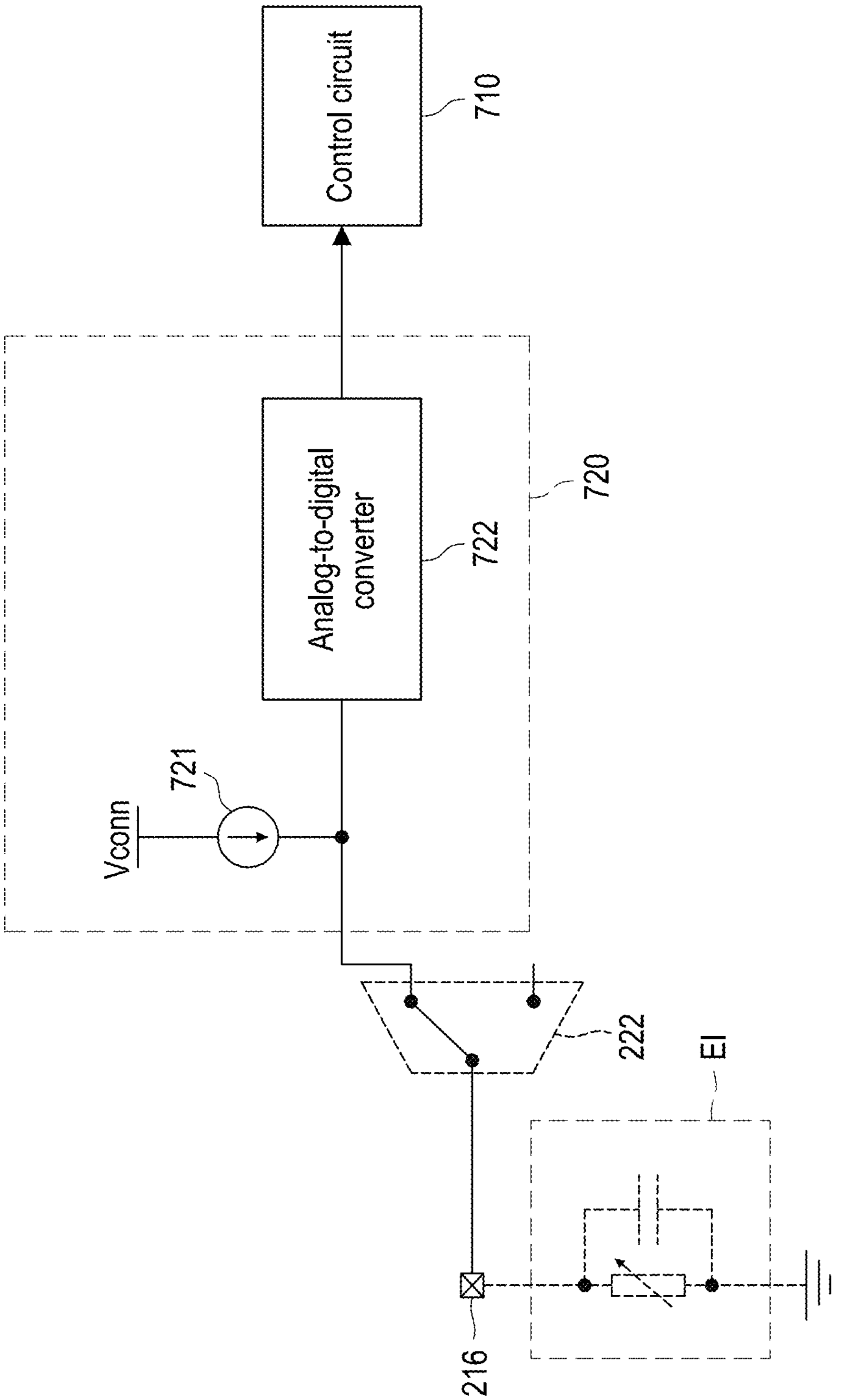
FIG. 8 is a schematic circuit block diagram of a humidity detection circuit according to an embodiment of the invention.

FIG. 8 is a schematic circuit block diagram of the humidity detection circuit 720 according to an embodiment of the invention. For descriptions of the target pin 216, the parasitic electrochemical impedance EI, the multiplexer 222, the humidity detection circuit 720 and the control circuit 710 shown in FIG. 8, reference may be made to relevant descriptions of the target pin 216, the parasitic electrochemical impedance EI, the multiplexer 222, the humidity detection circuit 720 and the control circuit 710 shown in FIG. 7, and details thereof are not repeated. In the embodiment shown in FIG. 8, the humidity detection circuit 720 includes a current source 721 and an analog-to-digital converter (ADC) 722. The current source 721 is coupled to the detection terminal of the humidity detection circuit 720 to provide current to the parasitic electrochemical impedance EI between the target pin 216 and ground through the multiplexer 222. An input terminal of the analog-to-digital converter 722 is coupled to the detection terminal of the humidity detection circuit 720 to receive a voltage of the target pin 216 through the multiplexer 222. An output terminal of the analog-to-digital converter 722 is coupled to the control circuit 710 to provide the detection result related to the parasitic electrochemical impedance EI.

Figure 9:
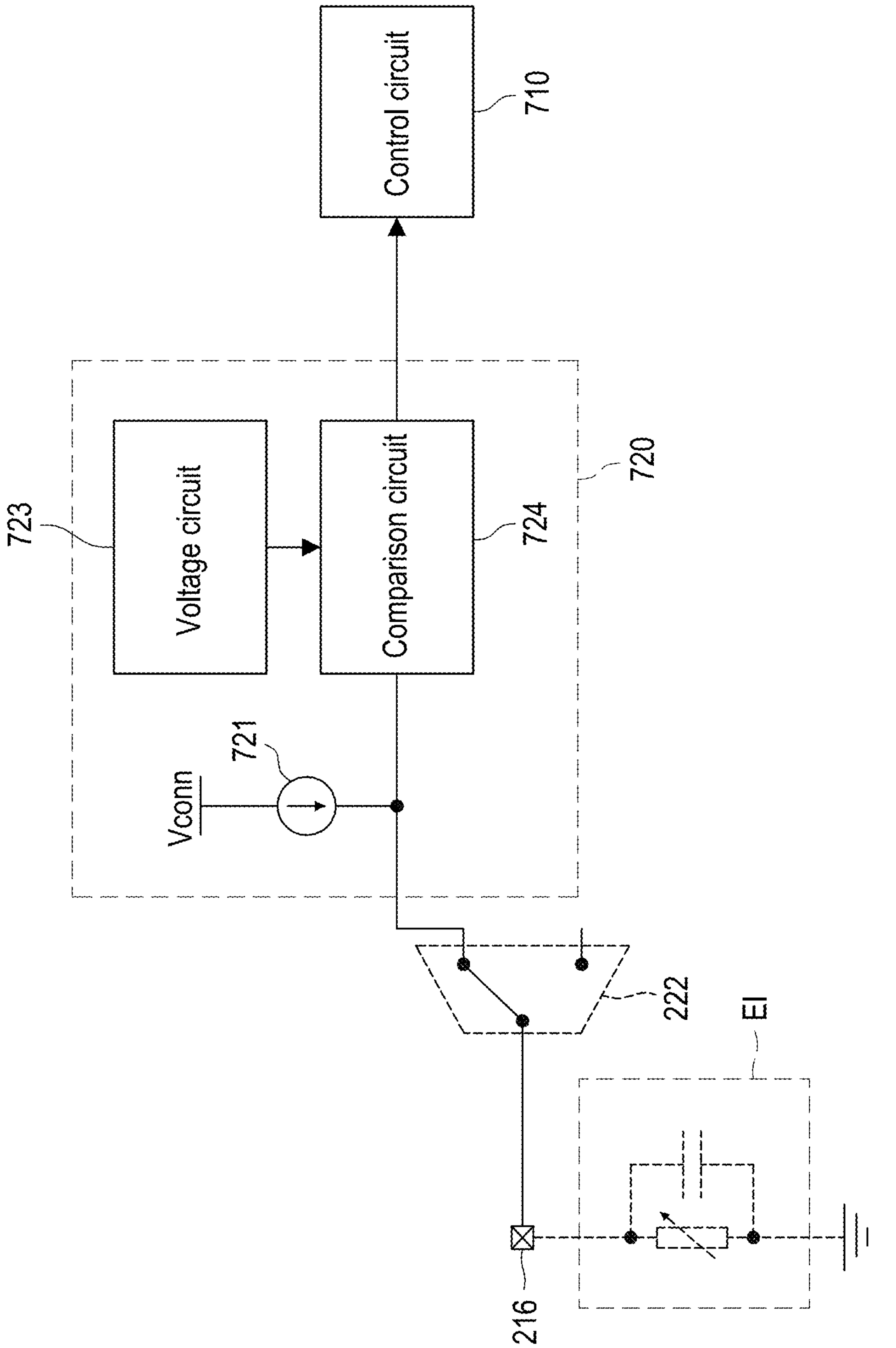
FIG. 9 is a schematic circuit block diagram of a humidity detection circuit according to another embodiment of the invention.

FIG. 9 is a schematic circuit block diagram of the humidity detection circuit 720 according to another embodiment of the invention. For descriptions of the target pin 216, the parasitic electrochemical impedance EI, the multiplexer 222, the humidity detection circuit 720 and the control circuit 710 shown in FIG. 9, reference may be made to relevant descriptions of the target pin 216, the parasitic electrochemical impedance EI, the multiplexer 222, the humidity detection circuit 720 and the control circuit 710 shown in FIG. 7, and details thereof are not repeated. In the embodiment shown in FIG. 9, the humidity detection circuit 720 includes a current source 721, a voltage circuit 723 and a comparison circuit 724. For description of the current source 721 shown in FIG. 9, reference may be made to the relevant description of the current source 721 shown in FIG. 8, and detail thereof is not repeated.

The voltage circuit 723 may provide at least one threshold voltage to the comparison circuit 724. The threshold voltage provided by the voltage circuit 723 may be any voltage determined according to an actual design. For example, the threshold voltage provided by the voltage circuit 723 may be a reference voltage corresponding to a humidity of 80%. A first input terminal of the comparison circuit 724 is coupled to the detection terminal of the humidity detection circuit 720 to receive a voltage of the target pin 216 through the multiplexer 222. A second input terminal of the comparison circuit 724 is coupled to the voltage circuit 723 to receive the threshold voltage. The comparison circuit 724 compares the voltage of the detection terminal of the humidity detection circuit 720 (the voltage of the target pin 216) with the threshold voltage to obtain a comparison result. An output terminal of the comparison circuit 724 is coupled to the control circuit 710 to provide the comparison result as the detection result related to the parasitic electrochemical impedance EI.

Figure 10:
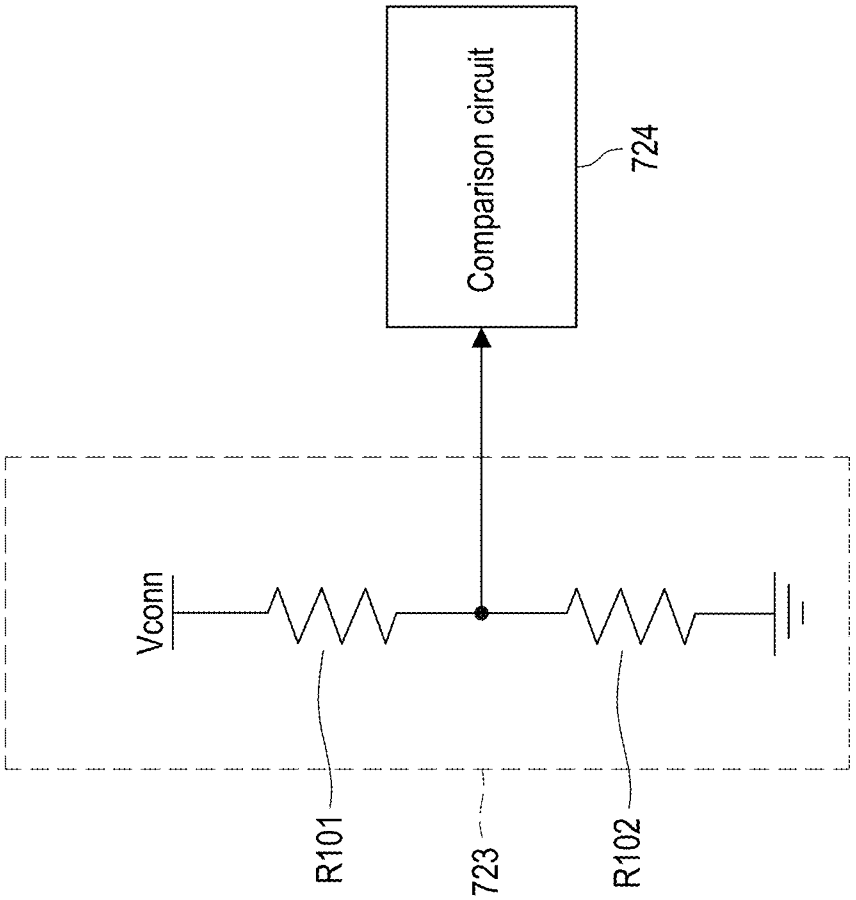
FIG. 10 is a schematic circuit diagram of a voltage circuit according to an embodiment of the invention.

FIG. 10 is a schematic circuit diagram of the voltage circuit 723 according to an embodiment of the invention. For descriptions of the voltage circuit 723 and the comparison circuit 724 shown in FIG. 10, reference may be made to the relevant descriptions of the voltage circuit 723 and the comparison circuit 724 shown in FIG. 9, and details thereof are not repeated. In the embodiment shown in FIG. 10, the voltage circuit 723 includes a resistor R101 and a resistor R102. A first terminal of the resistor R101 is coupled to a CC pin Vconn of the USB connector (for example, the pin Vcon1 of the USB connector 210 and/or the pin Vcon2 of the USB connector 230). A second terminal of the resistor R101 is coupled to the comparison circuit 724 to provide the threshold voltage. A first terminal of the resistor R102 is coupled to the second terminal of the resistor R101. A second terminal of the resistor R102 is coupled to a reference voltage (such as a ground voltage or other fixed voltages). The resistors R101 and R102 are connected in series to form a voltage dividing circuit, where a voltage dividing node between the resistors R101 and R102 may provide a divided voltage (threshold voltage) to the comparison circuit 724. By setting a resistance ratio of the resistors R101 and R102, the threshold voltage may be determined according to the actual design.

Based on the description of "the resistor R101 and the resistor R102 provide a single threshold voltage to the comparison circuit 724", those skilled in the art may infer that "the voltage circuit 723 provides a plurality of threshold voltages to the comparison circuit 724". For example, a plurality of sets of voltage dividing circuits (for example, the resistors R101 and R102 are a set of voltage dividing circuits) are used to provide a plurality of threshold voltages to the comparison circuit 724. Alternatively, a plurality of resistors are connected in series to form one voltage dividing circuit with a plurality of voltage dividing nodes, where the plurality of voltage dividing nodes may provide the plurality of threshold voltages to the comparison circuit 724.

Figure 11:
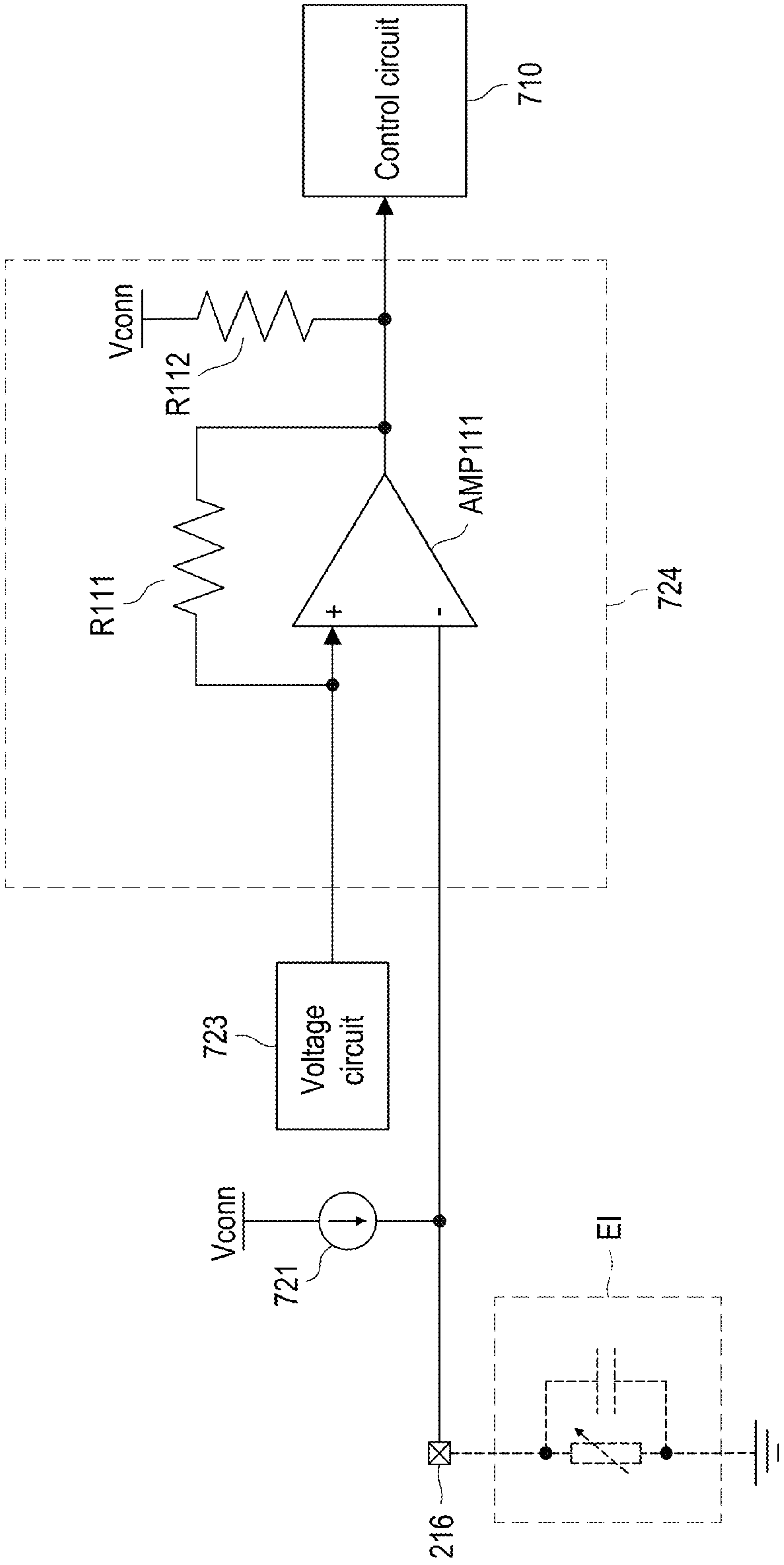
FIG. 11 is a schematic circuit diagram of a comparison circuit according to an embodiment of the invention.

FIG. 11 is a schematic circuit diagram of the comparison circuit 724 according to an embodiment of the invention. For descriptions of the target pin 216, the parasitic electrochemical impedance EI, the current source 721, the voltage circuit 723, the comparison circuit 724 and the control circuit 710 shown in FIG. 11, reference may be made to relevant descriptions of the target pin 216, the parasitic electrochemical impedance EI, the current source 721, the voltage circuit 723, the comparison circuit 724 and the control circuit 710 shown in FIG. 9, and details thereof are not repeated. In the embodiment shown in FIG. 11, the comparison circuit 724 includes an amplifier AMP111, a resistor R111, and a resistor R112. A first terminal of the resistor R111 is coupled to a first input terminal (for example, a non-inverting input terminal) of the amplifier AMP111. A second terminal of the resistor R111 is coupled to an output terminal of the amplifier AMP111. A first terminal of the resistor R112 is coupled to the CC pin Vconn of the USB connector (for example, the pin Vcon1 of the USB connector 210 and/or the pin Vcon2 of the USB connector 230). A second terminal of the resistor R112 is coupled to the output terminal of the amplifier AMP111.

The first input terminal of the amplifier AMP111 is coupled to a second input terminal of the comparison circuit 724 to receive the threshold voltage provided by the voltage circuit 723. The threshold voltage provided by the voltage circuit 723 may be any voltage determined according to the actual design. For example, the threshold voltage provided by the voltage circuit 723 may be a reference voltage corresponding to a humidity of 80%. A second input terminal (for example, an inverting input terminal) of the amplifier AMP111 is coupled to a first input terminal of the comparison circuit 724 to receive the voltage of the target pin 216. The output terminal of the amplifier AMP111 is coupled to an output terminal of the comparison circuit 724 to provide the detection result related to the parasitic electrochemical impedance EI to the control circuit 710.

Figure 12:
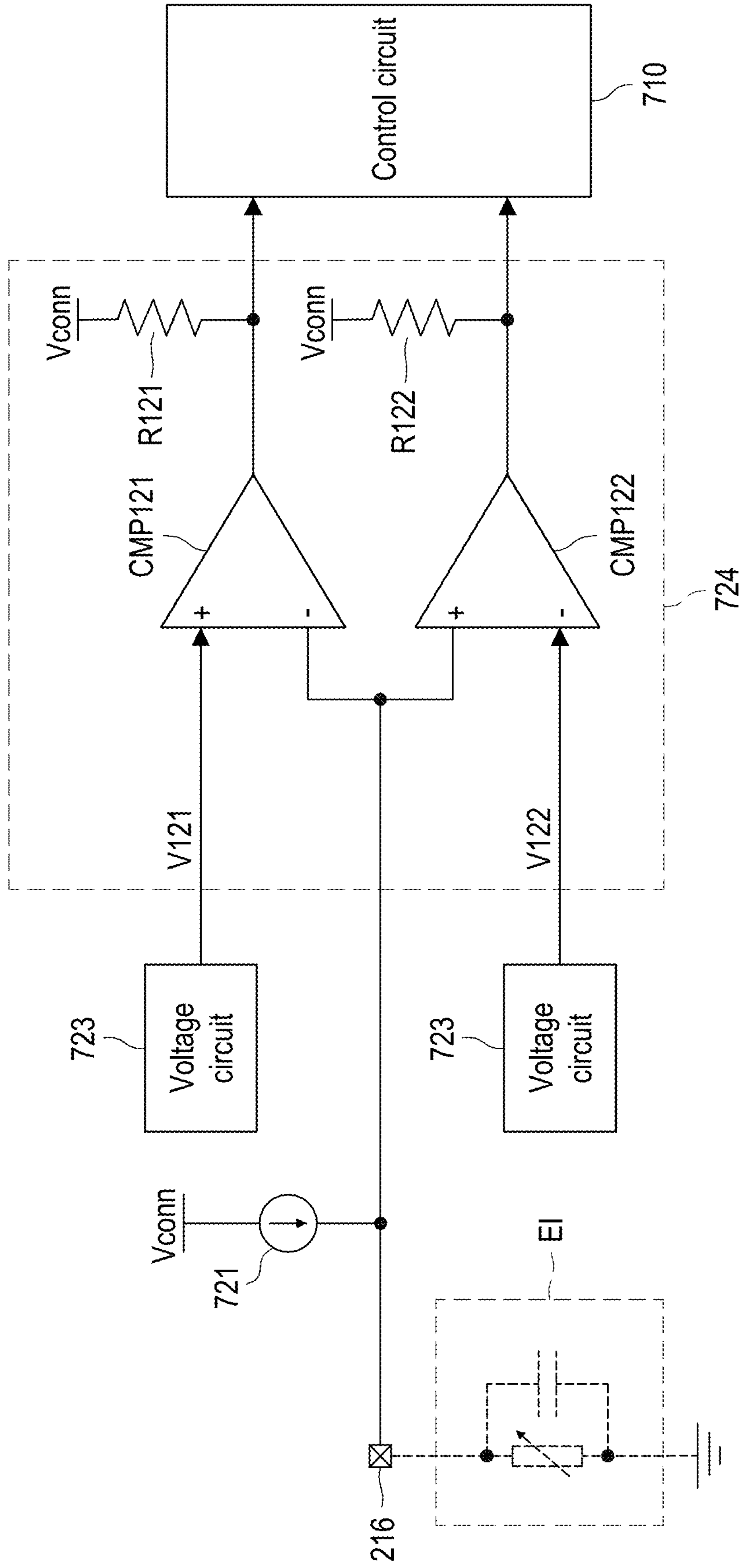
FIG. 12 is a schematic circuit diagram of a comparison circuit according to another embodiment of the invention.

FIG. 12 is a schematic circuit diagram of the comparison circuit 724 according to another embodiment of the invention. For descriptions of the target pin 216, the parasitic electrochemical impedance EI, the current source 721, the voltage circuit 723, the comparison circuit 724 and the control circuit 710 shown in FIG. 12, reference may be made to the target pin 216, the parasitic electrochemical impedance EI, the current source 721, the voltage circuit 723, the comparison circuit 724 and the control circuit 710 shown in FIG. 9, and details thereof are not repeated. In the embodiment of FIG. 12, the comparison circuit 724 includes a comparator CMP121, a comparator CMP122, a resistor R121 and a resistor R122, and the voltage circuit 723 may provide a threshold voltage V121 and a threshold voltage V122 to the comparison circuit 724. The threshold voltage V121 and the threshold voltage V122 may be different voltages determined according to the actual design. For example, the threshold voltage V121 may be a reference voltage corresponding to a humidity of 80%, and the threshold voltage V122 may be a reference voltage corresponding to a humidity of 60%, so that the threshold voltage V121 is smaller than the threshold voltage V122.

A first input terminal (for example, a non-inverting input terminal) of the comparator CMP121 is coupled to the voltage circuit 723 to receive the threshold voltage V121. A second input terminal (for example, an inverting input terminal) of the comparator CMP121 is coupled to the first input terminal of the comparison circuit 724 to receive the voltage of the target pin 216. An output terminal of the comparator CMP121 is coupled to the output terminal of the comparison circuit 724 to provide the detection result related to the parasitic electrochemical impedance EI to the control circuit 710. A first terminal of the resistor R121 is coupled to the CC pin Vconn of the USB connector (for example, the pin Vcon1 of the USB connector 210 and/or the pin Vcon2 of the USB connector 230). A second terminal of the resistor R121 is coupled to the output terminal of the comparator CMP121.

A first input terminal (for example, a non-inverting input terminal) of the comparator CMP122 is coupled to the first input terminal of the comparison circuit 724 to receive the voltage of the target pin 216. A second input terminal (for example, an inverting input terminal) of the comparator CMP122 is coupled to the voltage circuit 723 to receive the threshold voltage V122. An output terminal of the comparator CMP122 is coupled to the output terminal of the comparison circuit 724 to provide the detection result related to the parasitic electrochemical impedance EI to the control circuit 710. A first terminal of the resistor R122 is coupled to the CC pin Vconn of the USB connector (for example, the pin Vcon1 of the USB connector 210 and/or the pin Vcon2 of the USB connector 230). A second terminal of the resistor R122 is coupled to the output terminal of the comparator CMP122.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A USB cable, comprising:

a first USB connector;

a second USB connector, coupled to the first USB connector, wherein a first configuration channel pin of the first USB connector is coupled to a second configuration channel pin of the second USB connector; and an e-marker device, coupled to the first configuration channel pin and a target pin of the first USB connector, wherein the e-marker device detects a parasitic electrochemical impedance between the target pin and ground during a test period, and the e-marker device obtains humidity information of the first USB connector based on the parasitic electrochemical impedance, wherein the e-marker device comprises:

an anomaly detection circuit, wherein a communication terminal of the anomaly detection circuit is coupled to the first configuration channel pin, a detection terminal of the anomaly detection circuit is coupled to the target pin other than the first configuration channel pin, wherein the communication terminal of the anomaly detection circuit is coupled to the second configuration channel pin of the second USB connector, wherein the target pin, the first configuration channel pin, and the second configuration channel pin are different from each other, wherein the communication terminal of the anomaly detection circuit is different from the detection terminal of the anomaly detection circuit, the anomaly detection circuit detects the parasitic electrochemical impedance of the target pin during the test period, and the anomaly detection circuit obtains the humidity information of the first USB connector based on the parasitic electrochemical impedance.

2. The USB cable as claimed in claim 1, wherein the target pin comprises a sideband use pin of the first USB connector.

3. The USB cable as claimed in claim 1, wherein the e-marker device determines whether to pull up a voltage level of the first configuration channel pin of the first USB connector to cut off a power delivery between the first USB connector and a USB host based on the humidity information.

4. The USB cable as claimed in claim 1, wherein the e-marker device provides the humidity information to a USB host through the first configuration channel pin of the first USB connector, and the USB host decides whether to cut off a power delivery between the first USB connector and the USB host.

5. The USB cable as claimed in claim 1, wherein the e-marker device is further coupled to a third configuration channel pin of the first USB connector, and the third configuration channel pin supplies power to the e-marker device.

6. The USB cable as claimed in claim 1, wherein the e-marker device is further coupled to a third configuration channel pin of the second USB connector, and the third configuration channel pin supplies power to the e-marker device.

7. The USB cable as claimed in claim 1, wherein the test period is within an initialization period as the first USB connector is plugged into a USB connector of a USB host.

8. The USB cable as claimed in claim 1, wherein the test period is within an idle period of the target pin.

9. The USB cable as claimed in claim 1, wherein the e-marker device further comprises:

a multiplexer, coupled between the target pin of the first USB connector and the detection terminal of the anomaly detection circuit, wherein the target pin comprises a sideband use pin of the first USB connector, a common terminal of the multiplexer is coupled to the sideband use pin, a first selection terminal of the multiplexer is coupled to the detection terminal of the anomaly detection circuit, and a second selection terminal of the multiplexer is coupled to a sideband use pin of the second USB connector.

10. The USB cable as claimed in claim 1, wherein the anomaly detection circuit comprises:

a humidity detection circuit, wherein a detection terminal of the humidity detection circuit is coupled to the detection terminal of the anomaly detection circuit, and the humidity detection circuit detects the parasitic electrochemical impedance of the target pin during the test period to obtain a detection result; and a control circuit, coupled to the humidity detection circuit to receive the detection result, wherein the control circuit obtains the humidity information of the first USB connector based on the detection result.

11. The USB cable as claimed in claim 10, wherein the control circuit is coupled to the first configuration channel pin of the first USB connector, and the control circuit determines whether to pull up a voltage level of the first configuration channel pin of the first USB connector to cut off a power delivery between the first USB connector and a USB host based on the humidity information.

12. The USB cable as claimed in claim 10, wherein the control circuit is coupled to the first configuration channel pin of the first USB connector, and the control circuit provides the humidity information to a USB host through the first configuration channel pin of the first USB connector, and the USB host decides whether to cut off a power delivery between the first USB connector and the USB host.

13. The USB cable as claimed in claim 10, wherein the humidity detection circuit comprises:

a current source, coupled to the detection terminal of the humidity detection circuit; and an analog-to-digital converter, wherein an input terminal of the analog-to-digital converter is coupled to the detection terminal of the humidity detection circuit, and an output terminal of the analog-to-digital converter is coupled to the control circuit to provide the detection result.

14. The USB cable as claimed in claim 10, wherein the humidity detection circuit comprises:

a voltage circuit, configured to provide at least one threshold voltage;

a current source, coupled to the detection terminal of the humidity detection circuit; and a comparison circuit, wherein a first input terminal of the comparison circuit is coupled to the detection terminal of the humidity detection circuit, a second input terminal of the comparison circuit is coupled to the voltage circuit to receive the at least one threshold voltage, the comparison circuit compares a voltage of the detection terminal of the humidity detection circuit with the at least one threshold voltage to obtain a comparison result, and an output terminal of the comparison circuit is coupled to the control circuit to provide the comparison result as the detection result.

15. The USB cable as claimed in claim 14, wherein the voltage circuit comprises:

a first resistor, wherein a first terminal of the first resistor is coupled to a third configuration channel pin of the first USB connector, and a second terminal of the first resistor is coupled to the comparison circuit to provide the at least one threshold voltage; and a second resistor, wherein a first terminal of the second resistor is coupled to the second terminal of the first resistor, and a second terminal of the second resistor is coupled to a reference voltage.

16. The USB cable as claimed in claim 14, wherein the comparison circuit comprises:

an amplifier, wherein a first input terminal of the amplifier is coupled to the second input terminal of the comparison circuit, a second input terminal of the amplifier is coupled to the first input terminal of the comparison circuit, and an output terminal of the amplifier is coupled to the output terminal of the comparison circuit;

a first resistor, wherein a first terminal of the first resistor is coupled to the first input terminal of the amplifier, and a second terminal of the first resistor is coupled to the output terminal of the amplifier; and a second resistor, wherein a first terminal of the second resistor is coupled to a third configuration channel pin of the first USB connector, and a second terminal of the second resistor is coupled to the output terminal of the amplifier.

17. The USB cable as claimed in claim 14, wherein the at least one threshold voltage comprises a first threshold voltage and a second threshold voltage, and the comparison circuit comprises:

a first comparator, wherein a first input terminal of the first comparator is coupled to the voltage circuit to receive the first threshold voltage, and a second input terminal of the first comparator is coupled to the first input terminal of the comparison circuit, and an output terminal of the first comparator is coupled to the output terminal of the comparison circuit;

a first resistor, wherein a first terminal of the first resistor is coupled to a third configuration channel pin of the first USB connector, and a second terminal of the first resistor is coupled to the output terminal of the first comparator;

a second comparator, wherein a first input terminal of the second comparator is coupled to the first input terminal of the comparison circuit, a second input terminal of the second comparator is coupled to the voltage circuit to receive the second threshold voltage, and an output terminal of the second comparator is coupled to the output terminal of the comparison circuit; and a second resistor, wherein a first terminal of the second resistor is coupled to the third configuration channel pin of the first USB connector, and a second terminal of the second resistor is coupled to the output terminal of the second comparator.

18. An e-marker device, comprising:

an anomaly detection circuit, wherein a communication terminal of the anomaly detection circuit is coupled to a first configuration channel pin of a first USB connector, a detection terminal of the anomaly detection circuit is coupled to a target pin of the first USB connector other than the first configuration channel pin of the first USB connector, wherein the communication terminal of the anomaly detection circuit is coupled to a second configuration channel pin of a second USB connector, wherein the target pin, the first configuration channel pin, and the second configuration channel pin are different from each other, wherein the communication terminal of the anomaly detection circuit is different from the detection terminal of the anomaly detection circuit, the anomaly detection circuit detects a parasitic electrochemical impedance between the target pin and ground during a test period, and the anomaly detection circuit obtains humidity information of the first USB connector based on the parasitic electrochemical impedance.

19. The e-marker device as claimed in claim 18, wherein the target pin comprises a sideband use pin of the first USB connector.

20. The e-marker device as claimed in claim 18, wherein the anomaly detection circuit determines whether to pull up a voltage level of the first configuration channel pin of the first USB connector to cut off a power delivery between the first USB connector and a USB host based on the humidity information.

21. The e-marker device as claimed in claim 18, wherein the anomaly detection circuit provides the humidity information to a USB host through the first configuration channel pin of the first USB connector, and the USB host decides whether to cut off a power delivery between the first USB connector and the USB host.

22. The e-marker device as claimed in claim 18, wherein the e-marker device is further coupled to a third configuration channel pin of the first USB connector, and the third configuration channel pin supplies power to the e-marker device.

23. The e-marker device as claimed in claim 18, wherein the test period is within an initialization period as the first USB connector is plugged into a USB connector of a USB host.

24. The e-marker device as claimed in claim 18, wherein the test period is within an idle period of the target pin.

25. The e-marker device as claimed in claim 18, further comprising:

a multiplexer, coupled between the target pin of the first USB connector and the detection terminal of the anomaly detection circuit, wherein the target pin comprises a sideband use pin of the first USB connector, a common terminal of the multiplexer is coupled to the sideband use pin, a first selection terminal of the multiplexer is coupled to the detection terminal of the anomaly detection circuit, and a second selection terminal of the multiplexer is coupled to a sideband use pin of the second USB connector.

26. The e-marker device as claimed in claim 18, wherein the anomaly detection circuit comprises:

a humidity detection circuit, wherein a detection terminal of the humidity detection circuit is coupled to the detection terminal of the anomaly detection circuit, and the humidity detection circuit detects the parasitic electrochemical impedance of the target pin during the test period to obtain a detection result; and a control circuit, coupled to the humidity detection circuit to receive the detection result, wherein the control circuit obtains the humidity information of the first USB connector based on the detection result.

27. The e-marker device as claimed in claim 26, wherein the control circuit is coupled to the first configuration channel pin of the first USB connector, and the control circuit determines whether to pull up a voltage level of the first configuration channel pin of the first USB connector to cut off a power delivery between the first USB connector and a USB host based on the humidity information.

28. The e-marker device as claimed in claim 26, wherein the control circuit is coupled to the first configuration channel pin of the first USB connector, and the control circuit provides the humidity information to a USB host through the first configuration channel pin of the first USB connector, and the USB host decides whether to cut off a power delivery between the first USB connector and the USB host.

29. The e-marker device as claimed in claim 26, wherein the humidity detection circuit comprises:

a current source, coupled to the detection terminal of the humidity detection circuit; and an analog-to-digital converter, wherein an input terminal of the analog-to-digital converter is coupled to the detection terminal of the humidity detection circuit, and an output terminal of the analog-to-digital converter is coupled to the control circuit to provide the detection result.

30. The e-marker device as claimed in claim 26, wherein the humidity detection circuit comprises:

a voltage circuit, configured to provide at least one threshold voltage;

a current source, coupled to the detection terminal of the humidity detection circuit; and a comparison circuit, wherein a first input terminal of the comparison circuit is coupled to the detection terminal of the humidity detection circuit, a second input terminal of the comparison circuit is coupled to the voltage circuit to receive the at least one threshold voltage, the comparison circuit compares a voltage of the detection terminal of the humidity detection circuit with the at least one threshold voltage to obtain a comparison result, and an output terminal of the comparison circuit is coupled to the control circuit to provide the comparison result as the detection result.

31. The e-marker device as claimed in claim 30, wherein the voltage circuit comprises:

a first resistor, wherein a first terminal of the first resistor is coupled to a third configuration channel pin of the first USB connector, and a second terminal of the first resistor is coupled to the comparison circuit to provide the at least one threshold voltage; and a second resistor, wherein a first terminal of the second resistor is coupled to the second terminal of the first resistor, and a second terminal of the second resistor is coupled to a reference voltage.

32. The e-marker device as claimed in claim 30, wherein the comparison circuit comprises:

an amplifier, wherein a first input terminal of the amplifier is coupled to the second input terminal of the comparison circuit, a second input terminal of the amplifier is coupled to the first input terminal of the comparison circuit, and an output terminal of the amplifier is coupled to the output terminal of the comparison circuit;

a first resistor, wherein a first terminal of the first resistor is coupled to the first input terminal of the amplifier, and a second terminal of the first resistor is coupled to the output terminal of the amplifier; and a second resistor, wherein a first terminal of the second resistor is coupled to a third configuration channel pin of the first USB connector, and a second terminal of the second resistor is coupled to the output terminal of the amplifier.

33. The e-marker device as claimed in claim 30, wherein the at least one threshold voltage comprises a first threshold voltage and a second threshold voltage, and the comparison circuit comprises:

a first comparator, wherein a first input terminal of the first comparator is coupled to the voltage circuit to receive the first threshold voltage, and a second input terminal of the first comparator is coupled to the first input terminal of the comparison circuit, and an output terminal of the first comparator is coupled to the output terminal of the comparison circuit;

a first resistor, wherein a first terminal of the first resistor is coupled to a third configuration channel pin of the first USB connector, and a second terminal of the first resistor is coupled to the output terminal of the first comparator;

a second comparator, wherein a first input terminal of the second comparator is coupled to the first input terminal of the comparison circuit, a second input terminal of the second comparator is coupled to the voltage circuit to receive the second threshold voltage, and an output terminal of the second comparator is coupled to the output terminal of the comparison circuit; and a second resistor, wherein a first terminal of the second resistor is coupled to the third configuration channel pin of the first USB connector, and a second terminal of the second resistor is coupled to the output terminal of the second comparator.

34. A humidity detection method for a USB connector, comprising:

detecting a parasitic electrochemical impedance between a target pin of the USB connector and ground during a test period; obtaining humidity information of the USB connector based on the parasitic electrochemical impedance; and providing, by an e-marker device, the humidity information to a USB host through a configuration channel pin of the USB connector, so that the USB host decides whether to cut off a power delivery between the USB connector and the USB host, wherein the e-marker device and the USB host are different from each other, wherein the e-marker device comprises:

an anomaly detection circuit, wherein a communication terminal of the anomaly detection circuit is coupled to a first configuration channel pin of a first USB connector, a detection terminal of the anomaly detection circuit is coupled to a target pin of the first USB connector other than the first configuration channel pin of the first USB connector, wherein the communication terminal of the anomaly detection circuit is coupled to a second configuration channel pin of a second USB connector, wherein the target pin, the first configuration channel pin, and the second configuration channel pin are different from each other, wherein the communication terminal of the anomaly detection circuit is different from the detection terminal of the anomaly detection circuit.

35. The humidity detection method as claimed in claim 34, wherein the target pin comprises a sideband use pin of the USB connector.

36. The humidity detection method as claimed in claim 34, further comprising:

determining whether to pull up a voltage level of the configuration channel pin of the USB connector to cut off the power delivery between the USB connector and the USB host based on the humidity information.

37. The humidity detection method as claimed in claim 34, wherein the test period is within an initialization period as the USB connector is plugged into a USB connector of the USB host.

38. The humidity detection method as claimed in claim 34, wherein the test period is within an idle period of the target pin.

* * * * *